Aug. 9, 1938.    H. McCARTHY    2,125,942
VALVE
Filed Aug. 25, 1937

INVENTOR.
Harry McCarthy
BY
Albert J. Henderson
ATTORNEY.

Patented Aug. 9, 1938

2,125,942

UNITED STATES PATENT OFFICE 2,125,942

VALVE

Harry McCarthy, Kewanee, Ill., assignor to Walworth Patents Inc., Boston, Mass., a corporation of Massachusetts Application August 25, 1937, Serial No. 160,751

9 Claims. (Cl. 74—424.8)

This invention relates to valves and more particularly to the actuating means therefor.

Although the invention is primarily adapted for use with gate valves wherein reciprocation of a threaded stem in a yoke nut or sleeve actuates the closure member or gate, and is so illustrated and described, it will be understood that this specific use is intended by way of example only and the invention is not so restricted. Moreover, it will be apparent that the device may be used in connection with power operated valves as well as those of the manually operated type described and shown.

Valves of the type described are sometimes operated in such a manner that the closure is wedged in its seat with inordinate force. This may occur from negligent handling, or where power operation is used from a defective clutch or switch mechanism. In such event an excessive load is applied to the yoke sleeve and failure of this member takes place. When this occurs there is nothing to prevent the line fluid from forcing the closure from its seat carrying the valve stem and handwheel with it, to the imminent danger of the operator.

It is an object of this invention to eliminate the danger resulting from such failure of valve parts.

Another object of the invention is to insure that the valve will remain in closed position until otherwise desired.

Another object of the invention is to confine structural damage, such as may result from excessive closing force, to a predetermined part of the valve.

Another object of the invention is to preserve the ease of operation of a valve while rendering it free from the hazards described.

Another object of the invention is to permit its application to either manually or power operated valves.

Another object of the invention is to accomplish the improvements without departing radically from standard practice in the design of valves or adding materially to the cost of manufacture.

Figure 2:
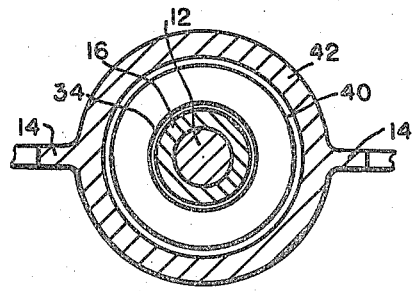
Figure 1:
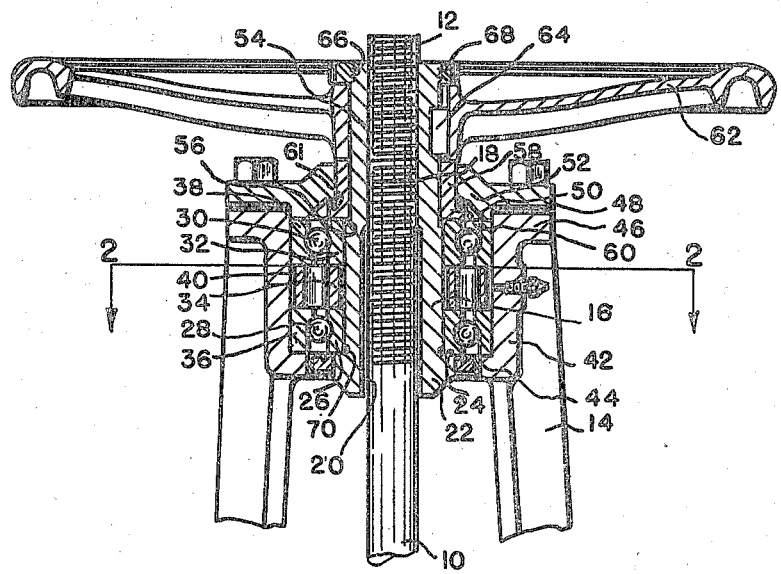

Other objects and advantages will become apparent from the following description taken in connection with the accompanying drawing wherein:

Fig. 1 is a fragmentary elevational view, partly in section, of a valve actuating means embodying the invention, and Fig. 2 is a section taken on the line 2—2 of Fig. 1, looking in the direction indicated by the arrows.

Referring more particularly to the drawing, the valve stem 10 which is of the rising type is provided with a threaded end 12 projecting through the yoke member 14 of the valve. A yoke sleeve 16 is provided with an internal threaded portion 18 at one end engaging the threaded valve stem 12 and with a thread clearance bore 20 at the other end. The yoke sleeve 16 is further provided with an enlarged head 22 defining a shoulder 24 upon which the inner ring 26 of an anti-friction bearing 28 is seated. A second anti-friction bearing 30 has an inner ring 32 engaging the sleeve 16 and spaced from the inner ring 26 by means of an annular inner spacer 34 surrounding the sleeve 16 between the bearings. The outer rings, 36 and 38 respectively, of the bearings 28 and 30 are separated by an annular outer spacer 40 disposed concentric with the inner spacer 34. These outer rings 36 and 38 are housed within an annular portion 42 of the yoke 14, preferably formed integral therewith. The annular portion 42 may be provided with an introverted flange 44 upon which the outer ring 36 may be seated.

Preferably, the annular portion 42 extends from the flange 44 to beyond the end face of the bearing 30 and terminates in a rim or flange 46 at the top of the yoke 14. Secured to the flange 46 is an annular cover member 48 having on its underside an annular depending portion 50 extending within the annular portion 42 of the yoke 14 and engaging the outer ring 38 of the bearing 30. The portion of the cover 48 adjacent its inner periphery is preferably raised, as at 52, to provide a clearance space between the underside thereof and the inner ring 32 of the bearing 30. An abutment surface 61 may be formed on the underside of the raised portion 52.

The yoke sleeve 16 is further provided with a reduced portion 54 extending from the end opposite the head 22 to a point intermediate its ends and defining an abutment surface 56 lying within the inner ring 32. A bushing 58 surrounds the reduced portion 54 of the sleeve 16 and is provided with a head 60 seated upon the inner ring 32 of bearing 30 and occupying the space between the abutment surface 61 of the cover and the inner ring 32. The head 60 of the bushing when seated as described is slightly spaced from both the abutment surfaces 56 and 61 as shown in Fig. 1. Surmounting the bushing 58 is the usual handwheel 62 secured to the sleeve 16 against rotation thereon as by means of the key 64. The end 66 of the sleeve 16 beyond the handwheel 62 may be threaded for the reception of a lock nut 68 for holding the parts together.

From the foregoing description it will be seen that when the parts are assembled the handwheel 62 may be operated to rotate the sleeve 16 on the threaded portion 18 of the stem for closing the valve. The sleeve 16 will be retained against axial movement relative to the yoke 14 during this rotation by reason of the head 22 at one end and the locknut 68 at the other holding the parts against such movement. Ordinary force in seating the closure will place a normal load on the sleeve enlargement 22 which will restrain the sleeve from axial movement relative to the yoke 14. Should excessive force be applied to the handwheel to force the closure member into its seat, an undue load will be applied to the yoke sleeve 16 by the stem threads tending to force it upwardly from the yoke. This load will also be assumed by the enlarged head 22 and cause failure of the sleeve at this or some other point. This invention is particularly directed toward preventing the yoke sleeve 16 from being forced out of the yoke 14 due to failure of the sleeve under load.

To this end, the yoke sleeve 16 is provided with a weakened section consisting of a groove 70 encircling the sleeve 16 at the junction of the shoulder 24 therewith. During normal use of the valve the parts will be retained in the position shown in Fig. 1 of the drawings and may be operated to open and close the valve as in the case of the usual gate valve actuating mechanism. However, should the closure member be wedged in its seat with sufficient force to cause the yoke sleeve to fail, the enlarged head 22 will be broken off at the weakened section due to the fact that the area through the sleeve at this point is less than the area at any other cross-section thereof. When this occurs the sleeve 16 will move axially relative to the stationary yoke 14 until the abutment surface 56 engages the head 60 on the bushing 58. The head 60 will then be moved by the sleeve into engagement with the abutment surface 61 on the cover and serve to restrain further axial movement of the sleeve. Hence, the abutment surfaces 56 and 61 cooperate with bushing 58 to form supplemental restraining for the sleeve when the normal restraining means is rendered ineffective.

By insuring that the yoke sleeve 16 will fail at a predetermined place, and by providing supplemental restraining means as described to prevent the sleeve from moving entirely out of the yoke, all danger to the operator which might be caused by the line fluid forcing the closure from its seat and forcibly ejecting the valve stem and handwheel from the valve, is eliminated. It will readily be seen that the provision of the anti-friction bearings renders the valve easy to operate under all conditions and no disadvantages from this aspect are involved in eliminating the hazards usually encountered in operating valves of the type described. There is no interference with the operating mechanism which may be of standard type, either manual or power. Consequently, all the objects of the invention have been attained in a simple and economical manner.

I claim:

1. Actuating means for valves and the like having a threaded stem, comprising a sleeve threadedly engaging said stem, means for rotating the sleeve on said stem, a stationary member within which said sleeve is journaled, means normally effective for restraining said sleeve against axial movement relative to said stationary member, and supplemental restraining means for said sleeve adapted to become operative should the first said restraining means be rendered ineffective.

2. Actuating means for valves and the like having a threaded stem, a sleeve threadedly engaging said stem, means for rotating said sleeve on said stem, a stationary member within which said sleeve is journaled, means normally effective for restraining said sleeve against axial movement relative to said stationary member, and spaced abutment surfaces associated with said sleeve and member and adapted to become operative to restrain substantial axial movement of the sleeve should the said restraining means be rendered ineffective.

3. Actuating means for valves and the like having a threaded stem, a sleeve threadedly engaging said stem, means for rotating said sleeve on said stem, a stationary member within which said sleeve is journaled, means normally effective for restraining said sleeve against axial movement relative to said stationary member, said means including an enlargement at one end of said sleeve having a weakened section, and spaced abutment surfaces associated with said sleeve and member and being adapted to become operative to restrain substantial axial movement of the sleeve upon failure at the weakened section.

4. Actuating means for valves and the like having a threaded stem, a sleeve threadedly engaging said stem, means for rotating said sleeve on said stem, a stationary member within which said sleeve is journaled, means normally effective for restraining said sleeve against axial movement relative to said stationary member, said means including an enlargement at one end of the sleeve having a weakened section, adjustable means at the opposite end of said sleeve, an abutment surface on said sleeve intermediate said enlargement and adjustable means, and an abutment surface associated with said stationary member and normally spaced from said sleeve abutment surface but being adapted to cooperate therewith to restrain substantial axial movement of the sleeve upon failure at the weakened section.

5. Actuating means for valves and the like having a threaded stem, a sleeve threadedly engaging said stem, means for rotating said sleeve on said stem, a stationary member extending around said sleeve, bearing means carried by said stationary member and engaging said sleeve, means normally effective for restraining said sleeve against axial movement relative to said stationary member, said means including an enlargement at one end of the sleeve beyond said bearing means, adjustable means at the opposite end of said sleeve holding said enlargement in engagement with the bearing, a weakened section on said sleeve adjacent the enlargement, an abutment surface on said sleeve intermediate said enlargement and adjustable means, and a bushing carried by said stationary member having an abutment surface normally spaced from said sleeve abutment surface but being adapted to abut thereon to restrain substantial axial movement of the sleeve upon failure at the weakened section.

6. Actuating means for valves and the like having a threaded stem, a sleeve threadedly engaging said stem, means for rotating said sleeve on said stem, a stationary member within which said sleeve is journaled, means normally effective for restraining said sleeve against axial movement relative to said stationary member, opposed abutment surfaces on said sleeve and stationary member spaced one from the other, and means having abutment surfaces thereon interposed between the other said surfaces and normally spaced therefrom but being adapted to abut thereon to restrain substantial axial movement of the sleeve should the first said restraining means be rendered ineffective.

7. Actuating means for valves and the like having a threaded stem, a sleeve threadedly engaging said stem, means for rotating said sleeve on said stem, a stationary member within which said sleeve is journaled, means normally effective for restraining said sleeve against axial movement relative to said stationary member, said means including an enlargement at one end of the sleeve having a weakened section, an abutment surface on said sleeve intermediate the enlargement and the opposite end thereof, an abutment surface associated with said stationary member and spaced from the sleeve abutment, and a bushing having abutment surfaces interposed between the other said surfaces and normally spaced therefrom but being adapted to abut thereon to restrain substantial axial movement of the sleeve upon failure at the weakened section.

8. Actuating means for valves and the like having a threaded stem, a sleeve threadedly engaging said stem, means for rotating said sleeve on said stem, a stationary member extending around said sleeve, bearing means carried by said stationary member and engaging said sleeve, means normally effective for restraining said sleeve against axial movement relative to said stationary member, said means including an enlargement at one end of the sleeve beyond said bearing means, adjustable means at the opposite end of said sleeve holding said enlargement in engagement with the bearing, a weakened section on said sleeve adjacent the enlargement, an abutment surface on said sleeve intermediate the enlargement and adjustable means, a cover member carried by said stationary member and serving to retain said bearing means therein, an abutment surface on said cover member spaced from the sleeve abutment, and a bushing for said sleeve having abutment surfaces interposed between the other said surfaces and normally spaced therefrom but being adapted to abut thereon to restrain substantial axial movement of the sleeve upon failure at the weakened section.

9. Actuating means for valves and the like having a threaded stem, a sleeve threadedly engaging said stem, means for rotating said sleeve on said stem, a stationary member having an annular portion extending around but spaced from said sleeve, an introverted flange at one end of said annular portion, anti-friction bearing means for said sleeve having inner and outer rings occupying the space within the annular member and having one end face of the outer ring seated upon said flange, means normally effective for restraining said sleeve against axial movement relative to said stationary member, said means including an enlargement at one end of the sleeve defining a shoulder upon which one end face of said inner ring is seated, adjustable means at the opposite end of said sleeve retaining said shoulder in engagement with said inner ring, a weakened section on said sleeve at the junction of the shoulder therewith, a reduced portion on said sleeve extending from said opposite end thereof to beyond the other end face of the inner ring, an abutment surface defined by said reduced portion on said sleeve, a cover member carried by the annular portion of said stationary member and seated upon said other end face of the outer ring, said outer ring being retained against axial movement in said annular portion by the flange and cover member at opposite ends thereof, said cover having a recessed portion spaced from the adjacent end face of the inner ring, a bushing interposed between the cover member and sleeve, and a head on said bushing normally spaced from said recessed portion of the cover and seated upon the adjacent end face of said inner ring, said head being engageable by the abutment surface on the sleeve and movable therewith into abutting relation with said recessed portion of the cover to restrain substantial axial movement of the sleeve upon failure at the weakened section.

HARRY McCARTHY.